Dec. 3, 1935.  A. R. THOMPSON  2,023,037
SPLIT PEACH PITTER
Filed Jan. 23, 1933  2 Sheets-Sheet 1

Inventor
Albert R. Thompson
By Lyon & Lyon
Attorneys

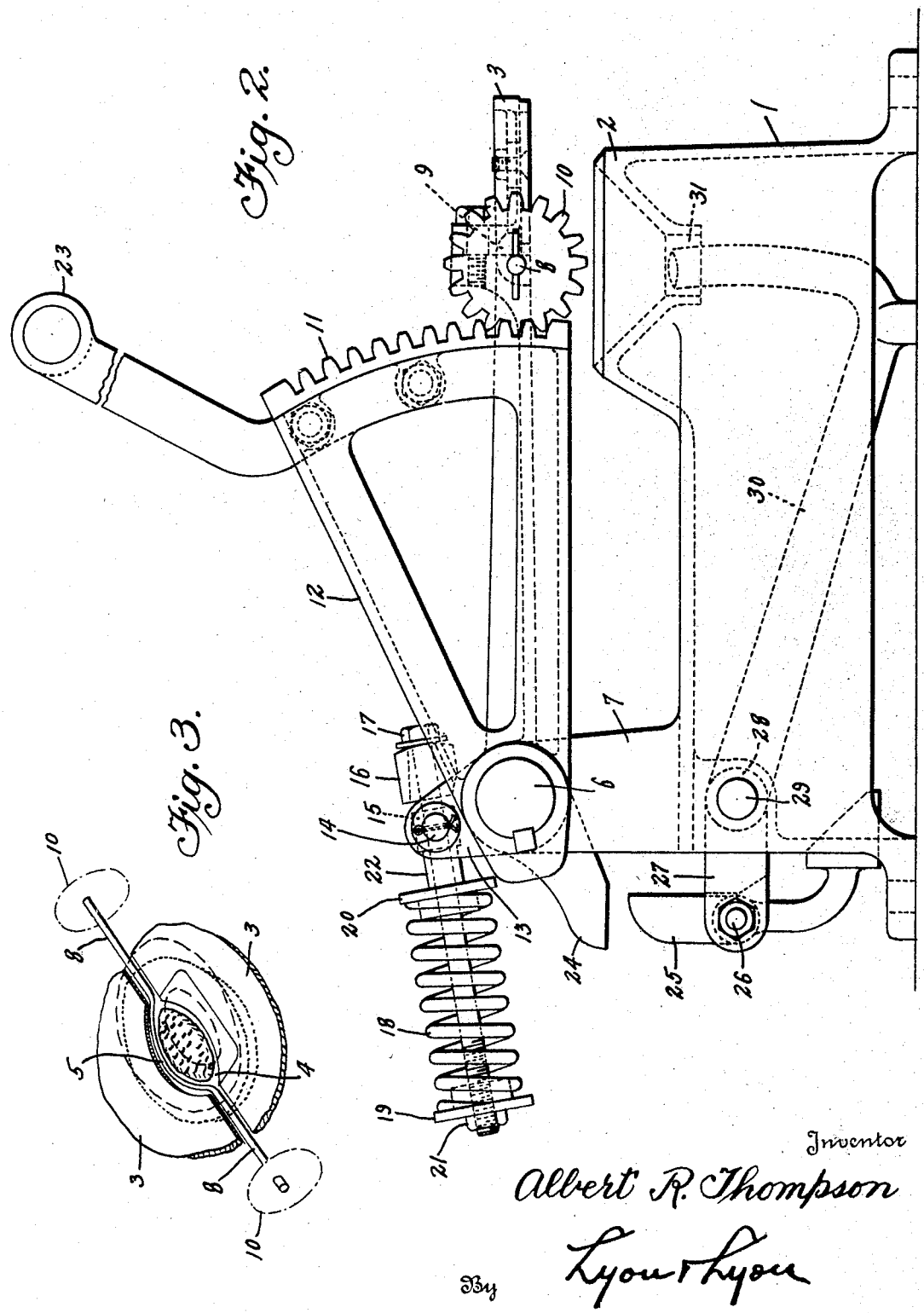

Patented Dec. 3, 1935

2,023,037

UNITED STATES PATENT OFFICE 2,023,037

SPLIT PEACH PITTER

Albert R. Thompson, San Jose, Calif., assignor to Pacific Machinery Company, San Francisco, Calif., a corporation of California Application January 28, 1933, Serial No. 654,001

7 Claims. (Cl. 146—28)

This invention relates to split peach pitters, and more particularly to a device adapted for the removing of pits from split or halved peaches. This application is a continuation in part of the application heretofore filed by me for a machine for pitting split fruits, Serial No. 103,760, filed April 22, 1926, and renewed January 8, 1932.

As disclosed in my co-pending application, the split pitter embodying my invention includes an orificed member which is adapted to contact the cut surface of the pit of the fruit in a substantially horizontal position so that the operator of the machine may at all times see the position of the split or halved fruit with relation to the pitting knife to enable the operator to shift or adjust the position of the split or halved fruit with relation to the pitting knife to enable the pitting knife to pass freely around the pit of the fruit.

It is an object of my invention to provide a method of and apparatus for the pitting of bisected peaches wherein the exposed surface of the bisected peach is contacted against a positioning surface with relation to a pitting knife so that the halved or bisected peach is manually held in position with relation to the positioning means under pressure to maintain the bisected or halved peach in position and so that during such positioning of the halved peach, pitting means may be operated to remove the pit from the flesh of the fruit.

Another object of my invention is to provide a machine or device for the removing of pits from previously split fruit consisting of a support which permits at all times visibility of the pit of the split fruit by the operator, and in which device there is provided a curved pitting knife which is carried by the supporting means and is adapted to swing beneath the support to cut the pit from the peach, and in which there is likewise provided means to assist the operator in positioning the pit with relation to the pitting knife, and means for manually rotating the pitting knife.

Another object of this invention is to provide a method and apparatus for the pitting of split peaches which consists of a substantially horizontal support against which a half peach may be pressed with its cut surface uppermost and which supporting means carries a curved pitting knife mounted with relation to an opening formed in the supporting means so that the operator is aided by the visibility provided through the opening in the support in the positioning of the pit of the half fruit with relation to the pitting knife, and in which there is provided means for manually rotating the pitting knife to cut the pit from the flesh of the fruit so that should the pitting means hang up upon the pit of the fruit, the pitting operation may be discontinued and the half of the fruit relocated with reference to the pit of the fruit, and the pitting operation may then be continued to sever the pit of the fruit from the flesh thereof without fracturing or breaking the pitting knife.

Another object of this invention is to provide a machine for removing the pits from split fruit which includes a support which is adapted to contact the cut surface of the halved or split fruit with the cut or halved surface of the split fruit uppermost, a rotary pitting knife mounted with relation to the supporting means, and means for manually rotating the pitting knife through the flesh of the fruit to remove the pit therefrom while so supported, and a resilient means for returning the knife to the normal or starting position.

Another object of this invention is to provide in a peach pitting apparatus a means against which the cut surface of the flesh of the fruit is manually placed with the cut side up to permit visibility and locating of the pit of the fruit with relation to a pitting knife carried with relation to said support, and in which pitting machine there is provided an adjustable means fixed in position when adjusted to assist the operator in positioning the pit of the fruit with relation to the pitting knife, and in which machine the pitting knife is of substantially semi-circular form mounted for rotation with its axis in the plane of the cut surface of the peach to be pitted, and a means whereby the operator may physically rotate the knife to pass the same through the pit of the fruit to remove the pit therefrom, which means permits of discontinued operation of the pitting member in the event the pitting knife hangs up on the pit of the fruit, so that the operator may relocate the half peach and pit with relation to the pitting knife.

Other objects and advantages of this invention it is believed will be apparent from the following detailed description of a preferred embodiment thereof as illustrated in the accompanying drawings.

In the drawings:

Figure 2 is a side elevation thereof.

Figure 3 is a diagrammatic view illustrating the pitting method embodying my invention and illustrating in dotted lines the relocation of the split peach with relation to the pitting means when the pitting means hangs up on the pit.

Figure 1:
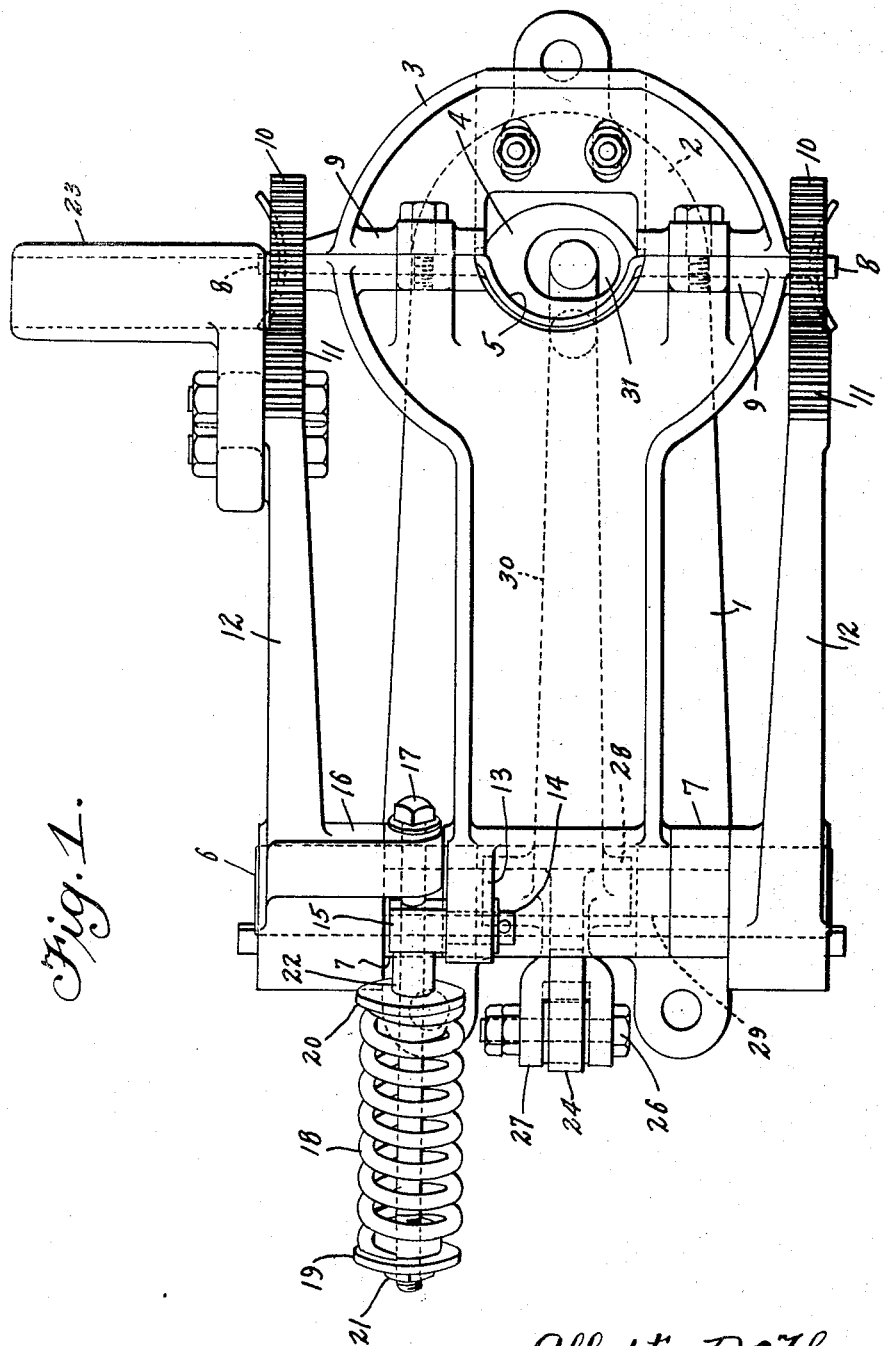
Figure 1 is a top plan view of the peach pitting device embodying my invention.

In the preferred embodiment of my invention as illustrated in the accompanying drawings, 1 indicates a base member adapted to be supported on a table or other support for a half fruit or peach. Mounted above the cup 2 is a pitting plate 3 which is formed with a pitting and observation elevation or opening 4 within which the pitting knife 5 is mounted normally in the plane of the pitting plate 3. The plate 3 is pivotally supported on a pivot 6 which passes through and is pivotally mounted within supporting skirts 7 which project upwardly from the base 1, thus permitting the pitting plate 3 to be swung upwardly away from the cup or support 2 so that the half of the fruit may be positioned in the cup 2 with its cut or halved surface uppermost.

The pitting knife 5 is a curved pitting knife curved approximately to the contour of the pit of the fruit to be pitted and has oppositely extending shanks 8 which pivotally support the knife 5 within bearing members 9 mounted on the upper surface of the plate 3. Secured to the end of the shanks 8 of the knife 5 are pinions 10 meshing with gear segments 11 for rotation of the knife 5 when the segments 11 are moved relative to the plate 3. The gear segments 11 are secured to arms 12 which extend rearwardly and are secured to the pivot 6 upon which the plate 3 is pivotally supported.

In the operation of positioning the half of fruit within the support or cup 2, the plate 3 and gear segments 11 are moved as a unit away from the cup 2 and in lowering the plate 3 until the lower surface of this plate contacts with the cut surface of the fruit, the gear segments 11 are held so that they do not move relatively to the pinions 10 until after the plate 3 has contacted the cut surface of the fruit and has been pressed downwardly against this surface. In order to accomplish this operation, the rearwardly portion of the plate 3 is provided with an upstanding ear 13 which carries on a pivot 14 a swivel connecting block 15. One of the arms 12 is provided with an inwardly extending bracket 16 and a connecting bolt 17 extends through the bracket 16 and through the pivoted connecting block 15 and a spring 18 is mounted upon the connecting bolt 17 between washers 19 and 20. The washer 19 is held in position by means of a nut 21 threaded to the free end of the bolt 17. The washer 20 is held in position by means of a cylindrical sleeve 22 which engages one flat surface of the connecting block 15. In this manner the plate 3 and the arms 12 of the gear segments 11 are yieldably connected together so that when the plate 3 has contacted the cut surface of the half fruit and the operating handle 23 which is connected to one of the gear segments 11 is further depressed, the gear segments 11 are moved with relation to the pinions 10 to cause the pinions 10 to rotate and hence to rotate the pitting knife 5.

The spring 18 likewise provides a means for returning the pitting knife 5 to its position normally in the plane of the pitting blade 3 on release of the actuating handle 23.

In order to eject the half fruit after the pit has been severed from the flesh thereof from the support or holding cup 2, there is secured to the pivot pin 6 an arm 24 which, on elevation of the plate 3, by the handle 23, engages a weighted arm 25 which is mounted on a pivot 26 carried in a fork 27. The shank of the fork 27 is secured to a sleeve 28 which is pivoted on a pivot 29 carried by the frame 1. Secured to the sleeve 28 is the ejector arm 30, the end of which extends upwardly through an opening 31 formed in the lower end of the support or cup 2 so that on raising of the ejector 30, the half of fruit is raised up above the support 2 or ejected therefrom.

The operation of the fruit pitter embodying my invention is that fruit previously halved by any suitable or desirable means is placed in a cup 2 with its cut surface uppermost. The handle 23 is gripped by the operator to lower the plate 3 into contact with the cut surface of the fruit. During this operation the operator observes the position of the pit of the fruit with relation to the pitting knife 5.

If the pit is not correctly located with respect to the pitting knife 5, the plate 3 may be elevated to permit the operator with his other hand to shift the position of the half fruit in the cup 2 so that the knife 5 will pass freely around the pit of the fruit and not hang up on the pit. In the event the operator does not correctly locate the pit of the fruit with relation to the pitting knife 5 and pulls downwardly on the handle 23 to rotate the pitting knife and the pitting knife hangs up on a portion or fragment of the pit, the operator stops the operation of the pitting knife and by raising upwardly thereon, relocates the position of the half fruit and by observation and a process of more or less feeling, causes the knife to pass around the pit of the fruit without damage to the knife or without cutting a portion of the pit of the fruit from the pit to remain in the pitted half of the fruit. The process of observation and relocation as thus described is an important part of my invention and as the operation is carried out manually, a skilled operator soon becomes very rapid in the operation of the pitting structure embodying my invention and operates the machine without damage to the pitting knife 5 or without mutilating the halves of the fruit due to the fact that operation is at all times under observation and under the manual control of the operator.

The pressure applied by the plate 3 to the cut surface of the fruit is manually applied between the plate 3 and the cut surface and is sufficient to hold the fruit and plate 3 in their relative positions as the pitting knife 5 moves downwardly from the opening in the plate 3 to pass around the pit of the fruit. The cup or support 2, or the edges thereof, form stops for the preliminary location of the half of the fruit relative to the pitting knife 5.

In Figure 3 I have diagrammatically illustrated the relation of the pitting knife 5, plate 3, and a half of a peach in contact with the plate and in position so that the pit P of the fruit may be cut from the half of the fruit. From this figure it will be observed that the operator having visibility of the position of the pit P through the opening in the plate 3 with relation to the curved pitting knife 5, may manually shift or adjust the relationship of the pit P of the fruit to the knife 5 at any time during the manual operation of the apparatus embodying my invention to avoid mutilation to the half of the fruit, the severing of a portion of the pit with the operation of cutting the pit from the fruit, and to avoid mutilation of the pitting knife should the same tend to hang up on the pit of the fruit.

Having fully described my invention, it is to be understood that I do not wish to be limited to the details herein set forth, but my invention is of the full scope of the appended claims.

I claim:

1. A machine for removing the pits from split fruits comprising a base, a receptacle adapted to hold the fruit centered, a pivoted plate connected to the base to bear upon the fruit placed in said receptacle, a pivotally supported knife carried thereby, and an operating handle adapted to hold the plate against the fruit, and means to rotate said knife substantially 180 degrees to cut the core or pit from the fruit.

2. A machine for pitting split fruits comprising a base, a receptacle adapted to hold the fruit centered thereon, a plate pivotally mounted on the base to bear upon the top of the fruit to hold the same in a given position, a semi-circular knife pivotally mounted on said plate, and means at each end of said knife to rotate it substantially 180 degrees whereby a substantially semi-spherical portion is removed from the fruit with the pit.

3. A machine for removing the pits or cores from split fruits comprising an adjustable receptacle adapted to hold the fruit centered, a plate pivoted on said base to bear upon the flat surface of the fruit when placed in the centering device, a knife carried by said flat plate having gears at opposite ends and having a substantially semi-circular knife, and means at both ends of the knife to turn it substantially 180 degrees.

4. A machine of the class described, comprising a base, a pair of fruit holding receptacles adjustably mounted thereon whereby a split fruit may be encircled and centered, a plate pivotally mounted on said base to bear upon the flat side of said fruit, a semi-circular knife and trunnions extending through said flat plate, an operating handle, and means whereby upon the operation of the handle the semi-circular knife will be turned substantially 180 degrees to core a fruit placed upon said receptacle.

5. A machine for pitting split fruits comprising an adjustable fruit receptacle adapted to hold the fruit centered, a plate pivotally mounted upon the receptacle base to bear upon the flat surface of the fruit to aid in holding it centered, a handle pivotally mounted on the base, a handle mounted upon the same pivot, a spring interposed between the handle and said plate, a semi-circular knife having trunnions extending through said plate, means at the opposite ends of said knife whereby it may be rotated, and segment gears carried by the handles for engaging the knife pinions and rotating them.

6. In a machine for pitting clingstone peaches, the combination of a cup supported with its concavity facing upwardly whereby it is adapted to receive a half peach with the plane surface thereof turned up, an apertured member movably mounted above said cup, a pitting means mounted on the apertured member to operate through said aperture, means for moving said apertured member downwardly to contact the plane surface of the half peach with the aperture in alignment with the pit, and means for actuating the pitting means while the apertured member is held in contact with the peach.

7. In a clingstone peach pitter, the combination of a fixed holder into which a halved peach is placed face up, an apertured surface plate movably mounted adjacent thereto for resilient engagement with the face of the peach, means for producing movement of the plate to first contact the plane surface of the halved fruit with the plate with the aperture in registry with the half peach pit, and means carried by the plate for severing the half pit from the peach half.

ALBERT R. THOMPSON.